Figures 1, 19:
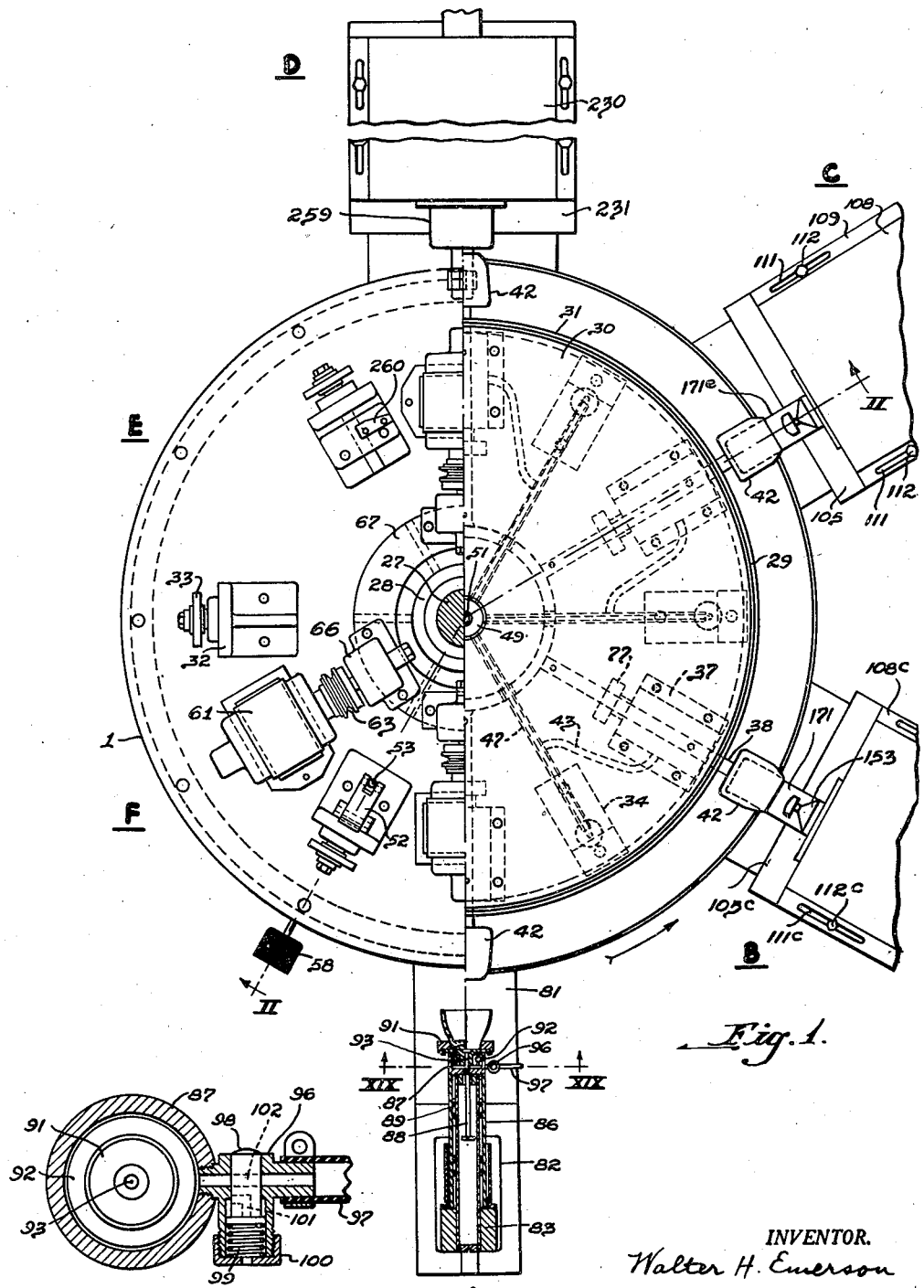

April 24, 1945. W. H. EMERSON 2,374,339
CUP FINISHING APPARATUS
Filed Feb. 11, 1944 13 Sheets-Sheet 1

INVENTOR.
Walter H. Emerson
BY
Brown, Critchlow & Flick
his ATTORNEYS.

April 24, 1945.  W. H. EMERSON  2,374,339
CUP FINISHING APPARATUS
Filed Feb. 11, 1944   13 Sheets-Sheet 2

WITNESSES.
E. J. Maloney
V. A. Peckham

INVENTOR.
Walter H. Emerson
BY Brown, Critchlow & Flick
his ATTORNEYS.

April 24, 1945.  W. H. EMERSON  2,374,339
CUP FINISHING APPARATUS
Filed Feb. 11, 1944  13 Sheets-Sheet 4

WITNESSES.
E. J. Maloney.
V. A. Peckham.

INVENTOR.
Walter H. Emerson
BY Brown, Critchlow & Flick
his ATTORNEYS.

April 24, 1945.　　W. H. EMERSON　　2,374,339
CUP FINISHING APPARATUS
Filed Feb. 11, 1944　　13 Sheets-Sheet 5

INVENTOR.
Walter H. Emerson
BY
Brown, Critchlow & Flick
his ATTORNEYS.

April 24, 1945.  W. H. EMERSON  2,374,339
CUP FINISHING APPARATUS
Filed Feb. 11, 1944    13 Sheets-Sheet 9

INVENTOR.
Walter H. Emerson
BY
Brown, Critchlow & Flick
his ATTORNEYS.

WITNESSES.
E. J. Maloney.
V. A. Peckham.

April 24, 1945. W. H. EMERSON 2,374,339
CUP FINISHING APPARATUS
Filed Feb. 11, 1944 13 Sheets-Sheet 12

WITNESSES.
E.J. Maloney.
V.A. Peckham.

INVENTOR.
Walter H. Emerson
BY
Brown, Critchlow & Flick
his ATTORNEYS.

Patented Apr. 24, 1945

2,374,339

UNITED STATES PATENT OFFICE 2,374,339

CUP FINISHING APPARATUS

Walter H. Emerson, East Liverpool, Ohio, assignor to The Homer Laughlin China Company, Newell, W. Va., a corporation of Delaware Application February 11, 1944, Serial No. 522,009

32 Claims. (Cl. 25—22)

This invention relates to apparatus for finishing partially dried clay cups, such as trimming and shaping their upper edges, turning feet on them, and burnishing them.

In the manufacture of china and semi-vitreous dinnerware cups from plastic clay, the first step is to shape them by jiggering balls of clay in plaster molds. In order to be able to remove the cups from the molds when they have dried enough to become leather hard or self-supporting, the lower ends of the mold cavities should be tapered and must not be provided with annular ribs that would lock the cups in the molds. This means that feet can not be formed on the cups by the molds. The tops of such cups are not rounded and smooth when removed from the molds, and the cups are not all the same height. Also, the outer surfaces of the cups which were in contact with the molds are not as smooth as desired. Accordingly, the partially dried cups are then placed on a rotating chuck. A workman beside the chuck holds a hand tool against the top of the cup to trim it and shape it. This is called "topping" the cups. He then holds another tool near the bottom of the rotating cup and cuts a groove around it to form a foot. As this operation, called "turning," adds materially to the cost of making the cup, it is often omitted with the result that the cups do not have the pleasing appearance of those with turned feet. The workman then holds a tool against the side of the rotating cup to burnish it. It will be seen that these three manual tooling operations require high priced skilled labor and therefore add materially to the cost of the cups. Another disadvantage is that it is difficult to make cups having feet that all are exactly the same size and shape, especially when the cups in any given set may have been made by several different workmen. No attempt is made to cut the cups down to a uniform height, because no way has been provided heretofore for doing such a desirable thing. The workman could hold his topping tool in the same position relative to the chuck for each cup, but some cups extend farther onto the chuck than others, so they would be made shorter as a result.

It is among the objects of this invention to provide apparatus which automatically tops, turns, and burnishes cups; which makes all of the cups the same height; which turns feet of uniform size on all of the cups; which does not require a skilled attendant; which is rapid in operation; and which materially decreases the cost of finishing cups.

In accordance with this invention a partially dried clay cup is fitted over the outer end of a rotary chuck beside which there is a clay-removing tool. Means is provided for moving the tool outwardly along the chuck and for also moving it transversely so that it will engage the cup. During topping, the cup is gradually cut down by the topping tool to a predetermined height that all of the cups are to have. This is controlled by stopping the outward movement of the tool at a certain distance from the bottom of the cup. The stopping is effected by gage means that has been moved into light contact with the bottom surface of the cup. The same type of independent gage means is desirable in the foot turning apparatus in order to assure steadiness of the tool without danger of deforming the cup.

The rotary chuck preferably is mounted on a turret with several other similar chucks all of which are indexed from station to station. The topping is done at one station, turning at another, and burnishing at still another. There also is a loading station at which cups are applied to the chucks, and an unloading station where the finished cups are removed. Between the unloading and loading stations there may be a station at which the chucks are cleaned in any suitable manner, either manual or automatic.

At the loading station each cup preferably is applied to the adjacent chuck by a loading chuck coaxial therewith. The loading chuck receives the bottom of the cup and holds it by vacuum or in some other suitable manner while the support for the loading chuck is moved in a straight line toward the rotary chuck. As soon as the cup is fitted over the rotary chuck, the cup is released from the loading chuck which then is withdrawn. The rotary chuck likewise may be a vacuum chuck.

The rotary chucks preferably are rigidly mounted on radial spindles rotatably mounted on the turret. At each of the finishing stations, continuously rotating means may be mounted adjacent the inner ends of the spindles. When the turret is brought to rest, these means are operatively connected with the adjacent spindles for rotating them for a short time while the cups on their outer ends are being finished.

Figure 2:
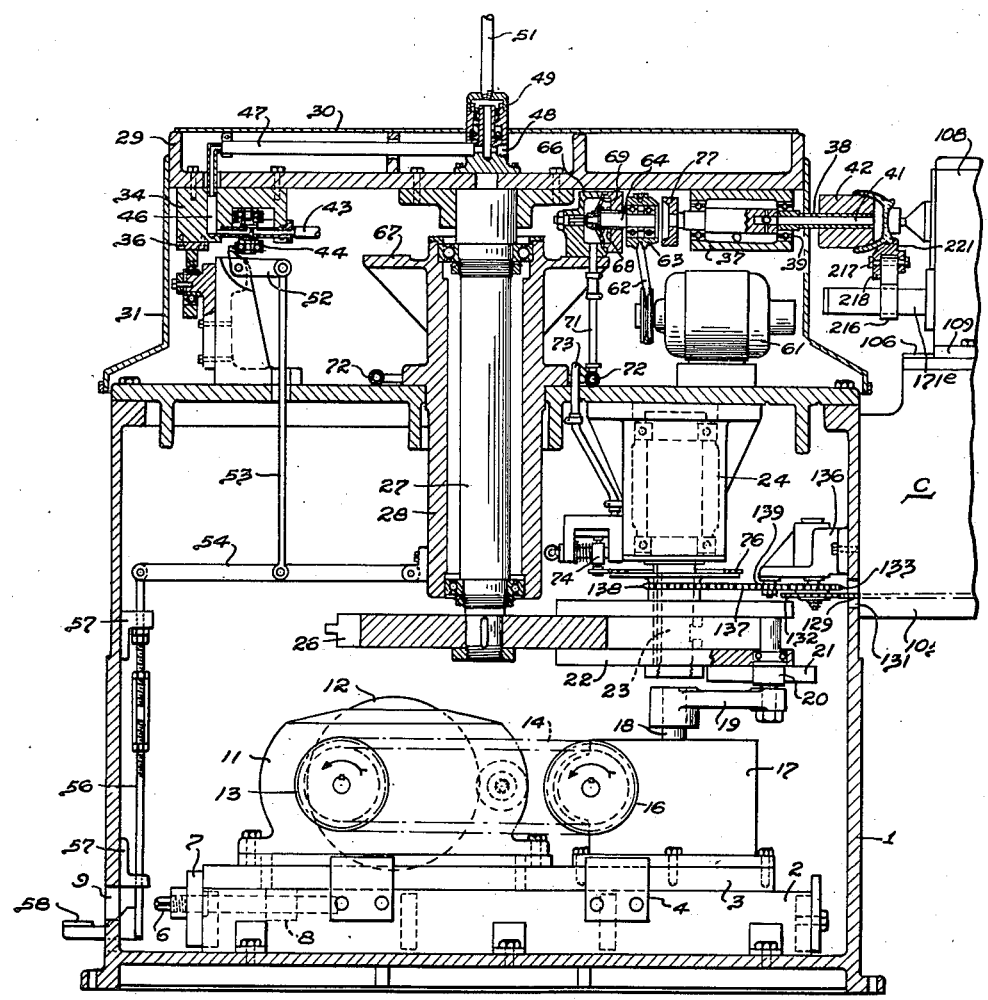
Figure 3:
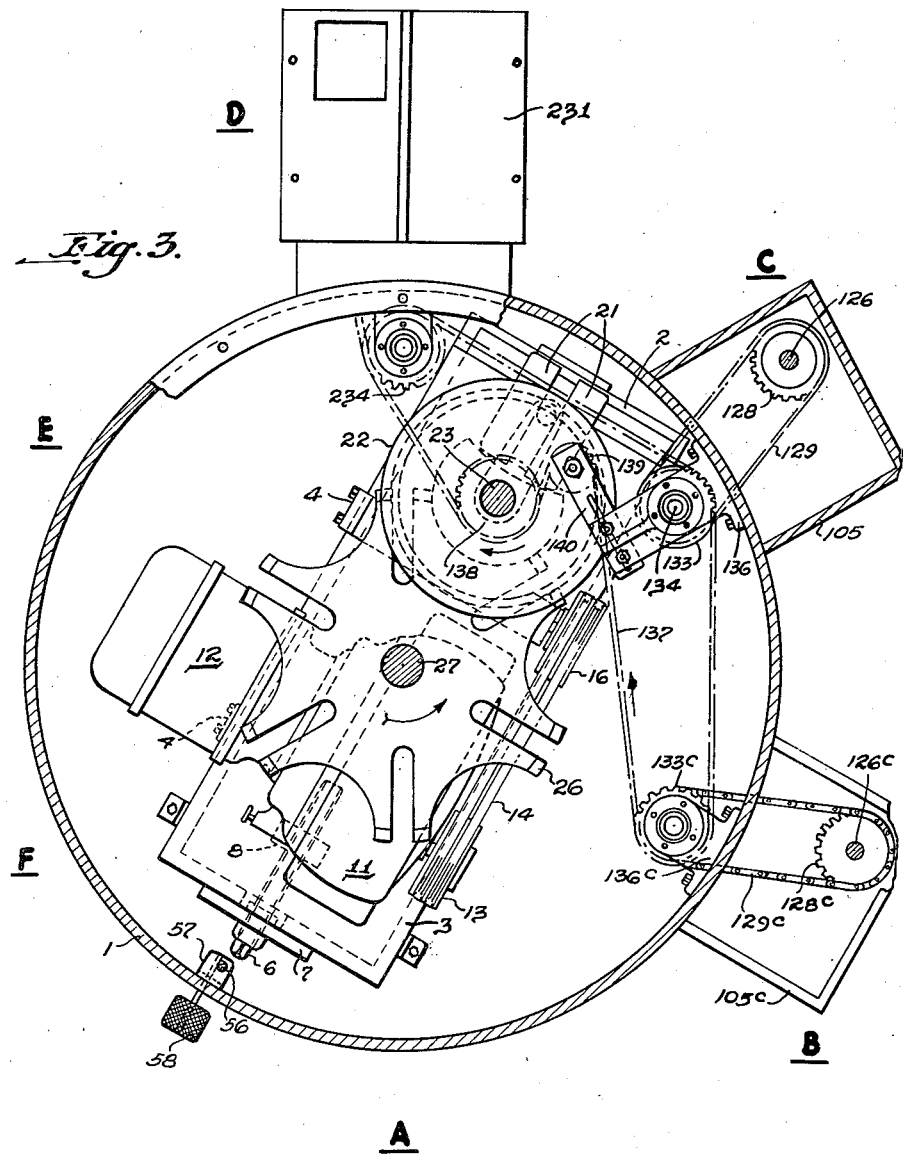
Figure 4:
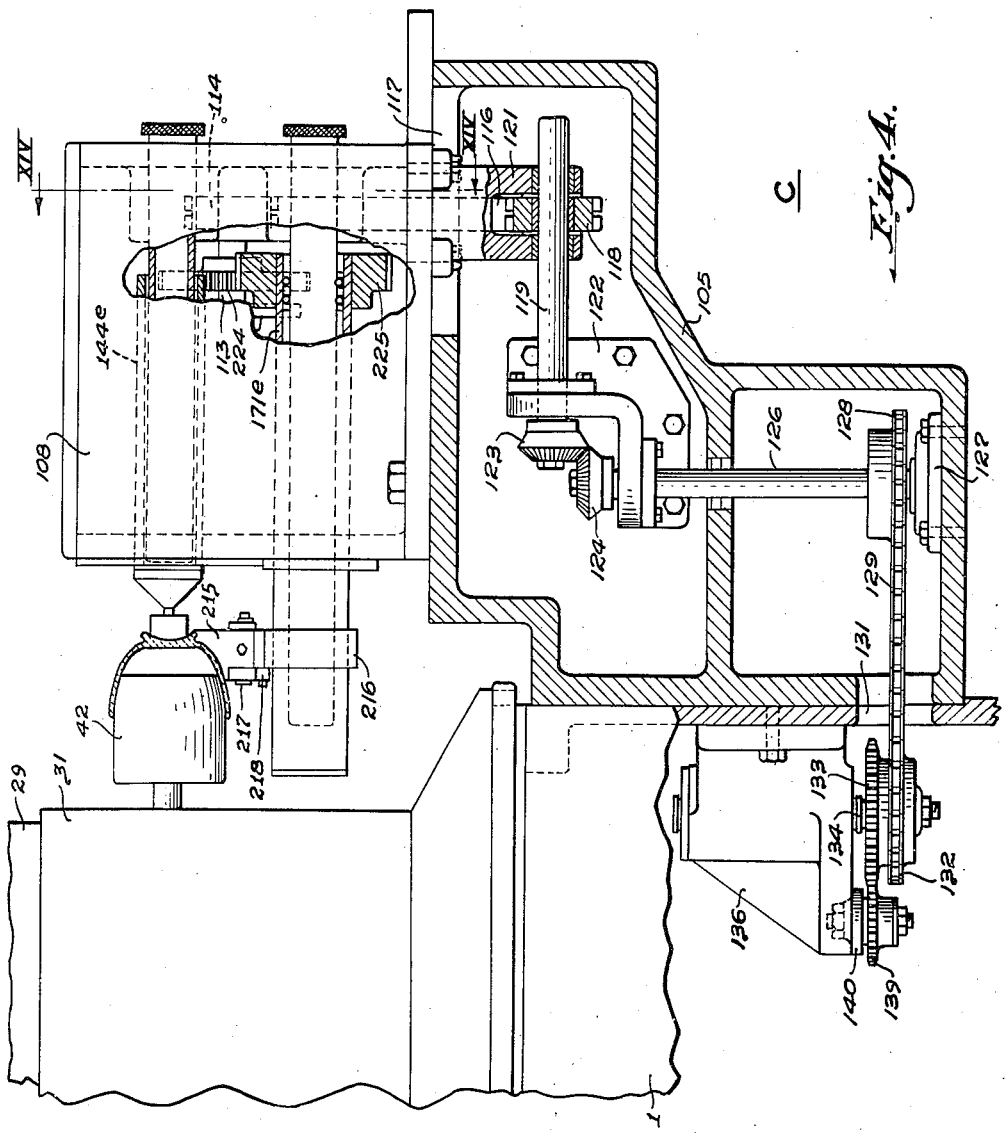
Figure 5:
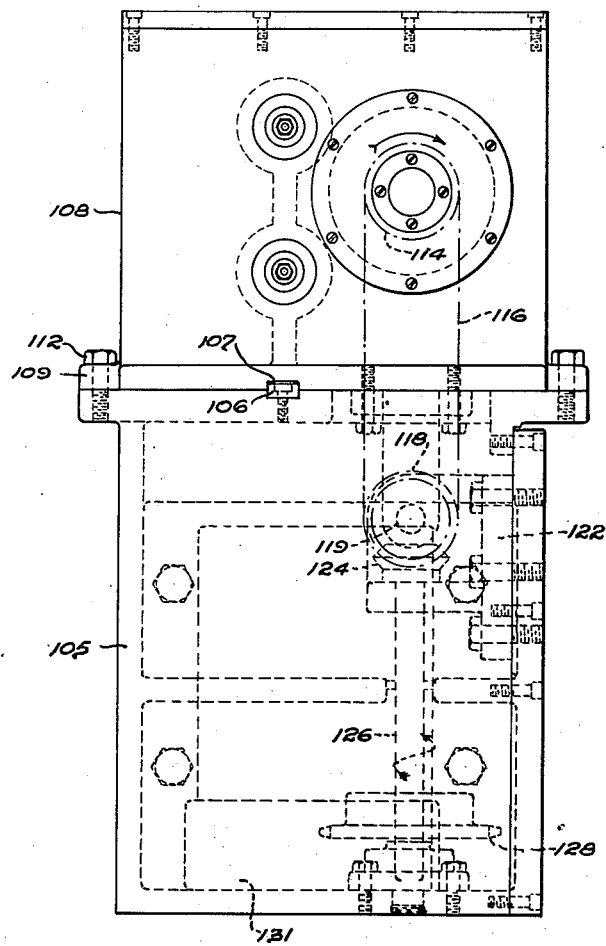
Figure 6:
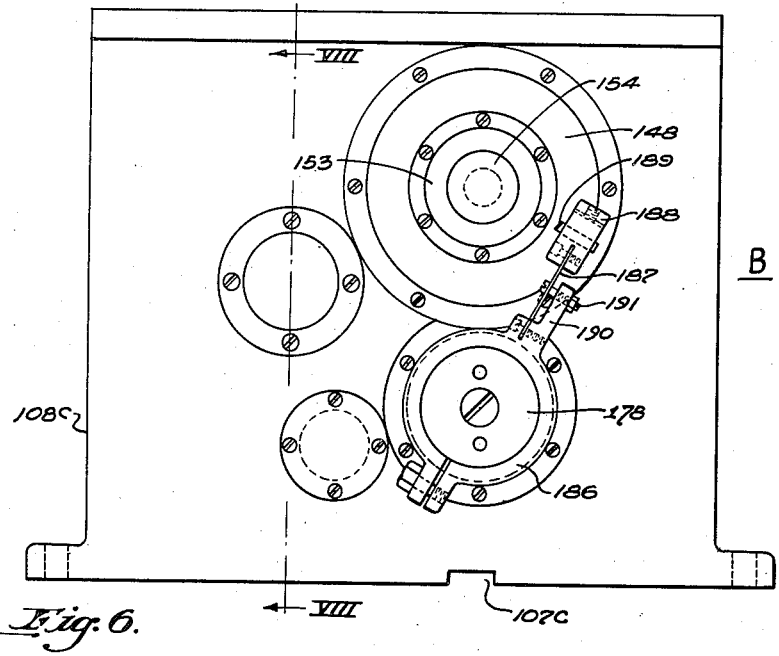
Figure 7:
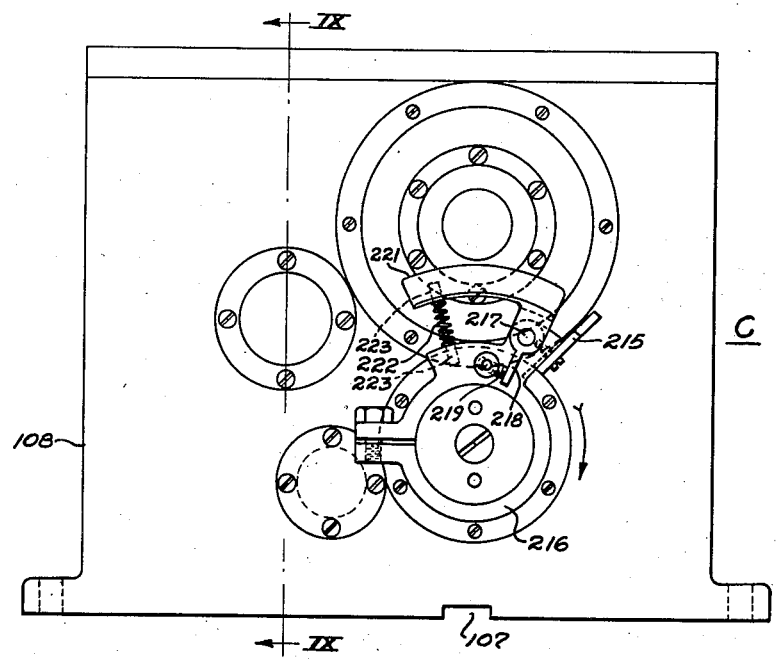
Figure 8:
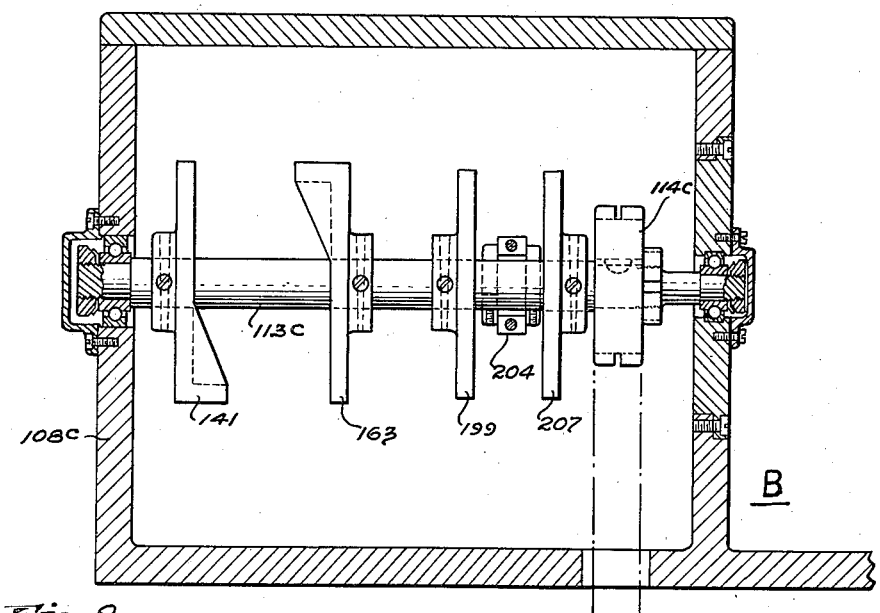
Figure 9:
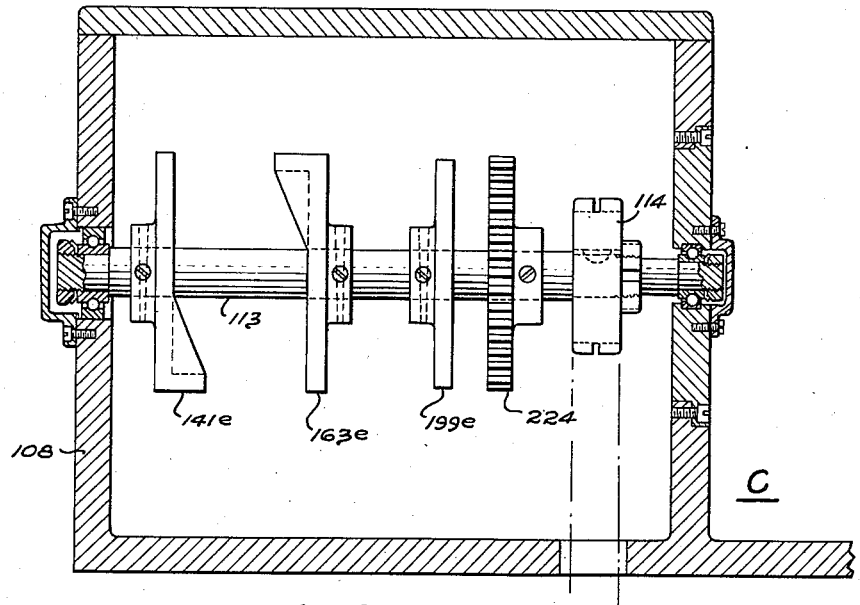
Figure 10:
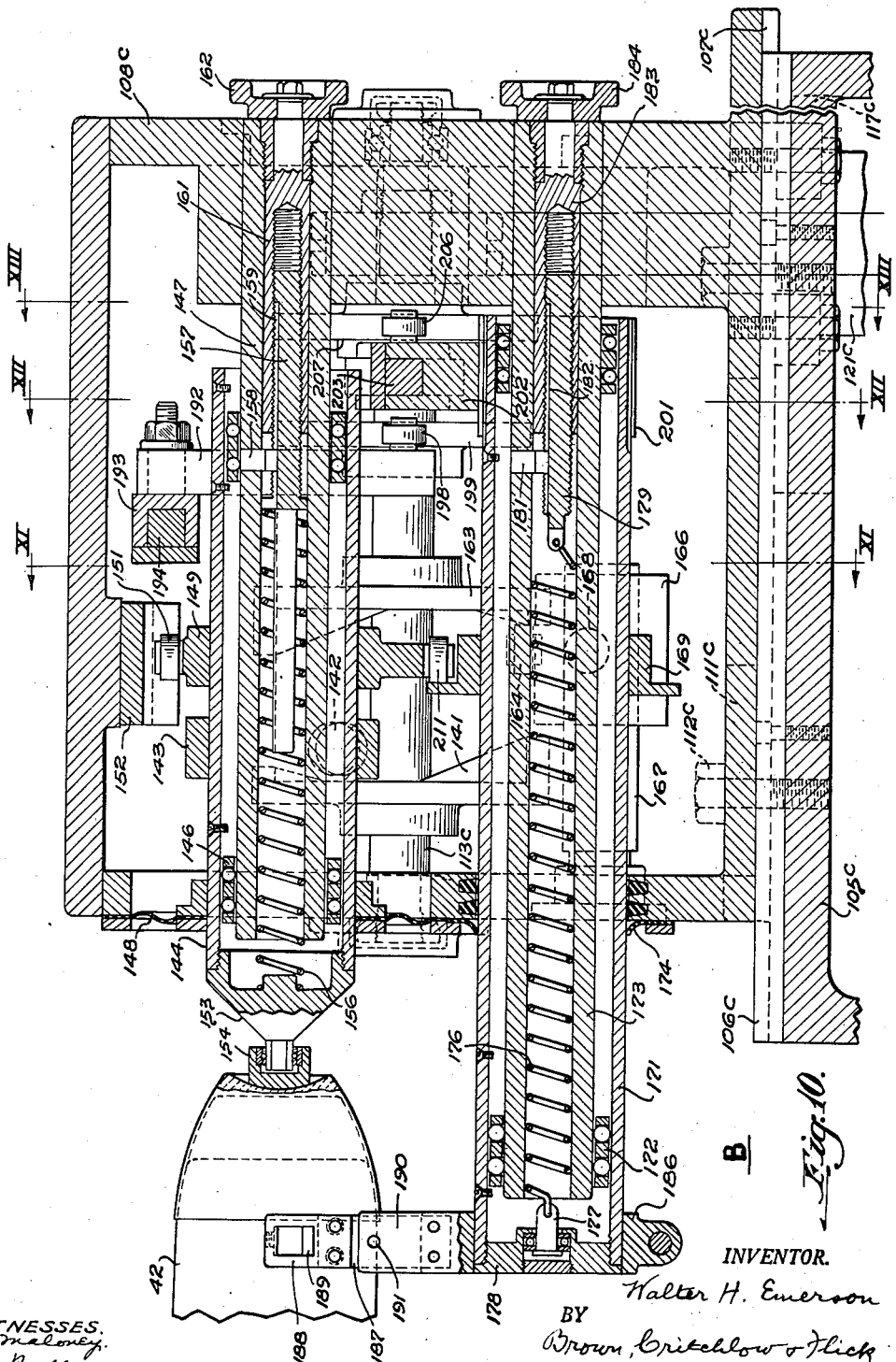
Figure 11:
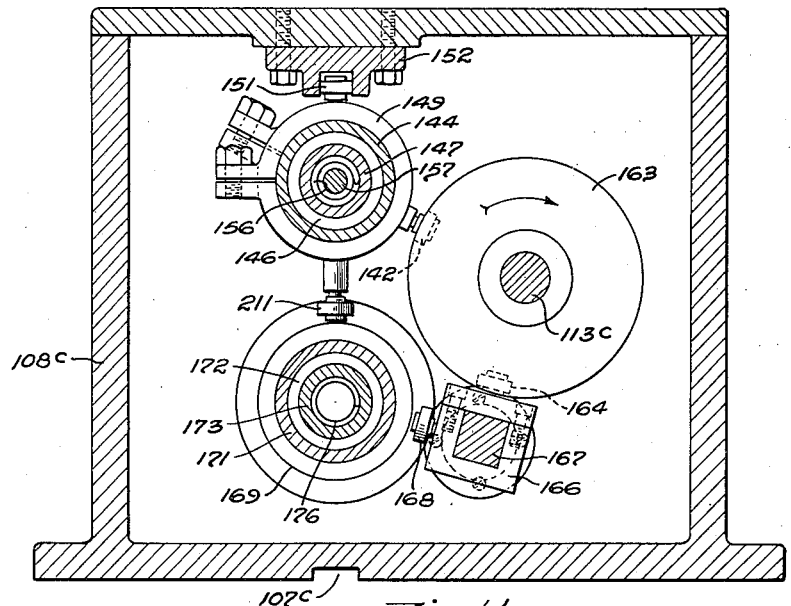
Figure 12:
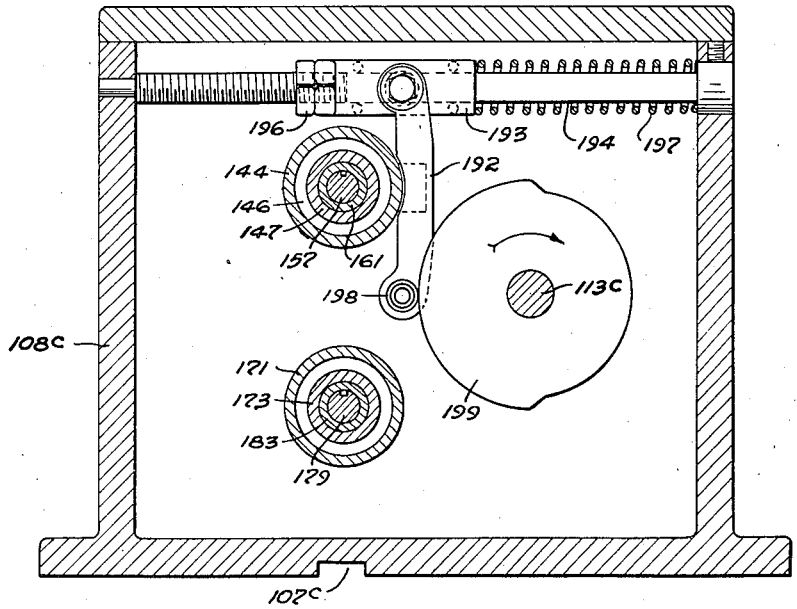
Figure 13:
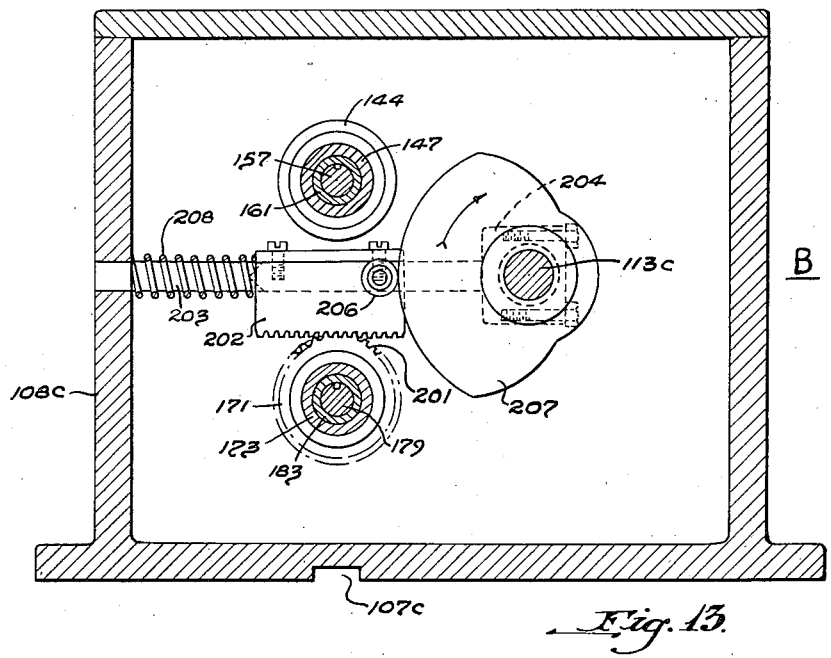
Figure 14:
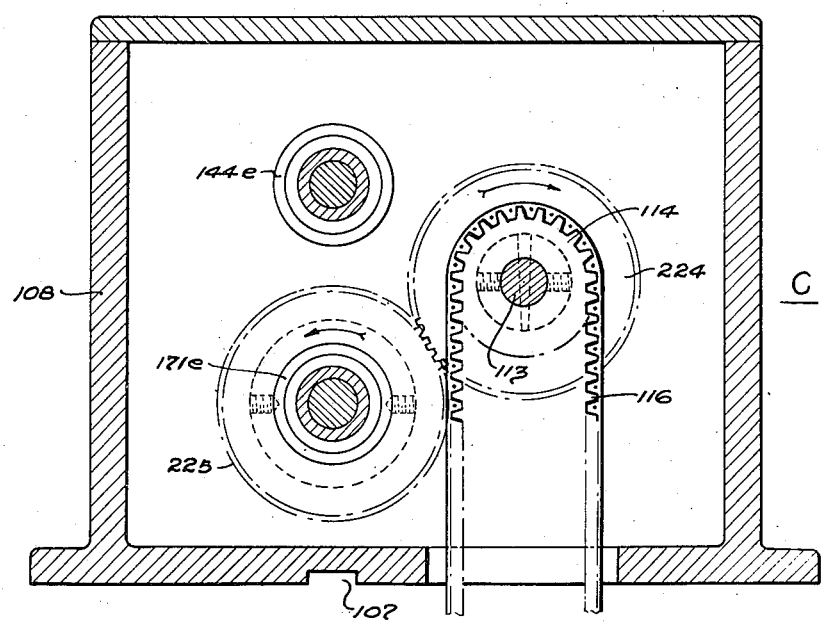
Figure 15:
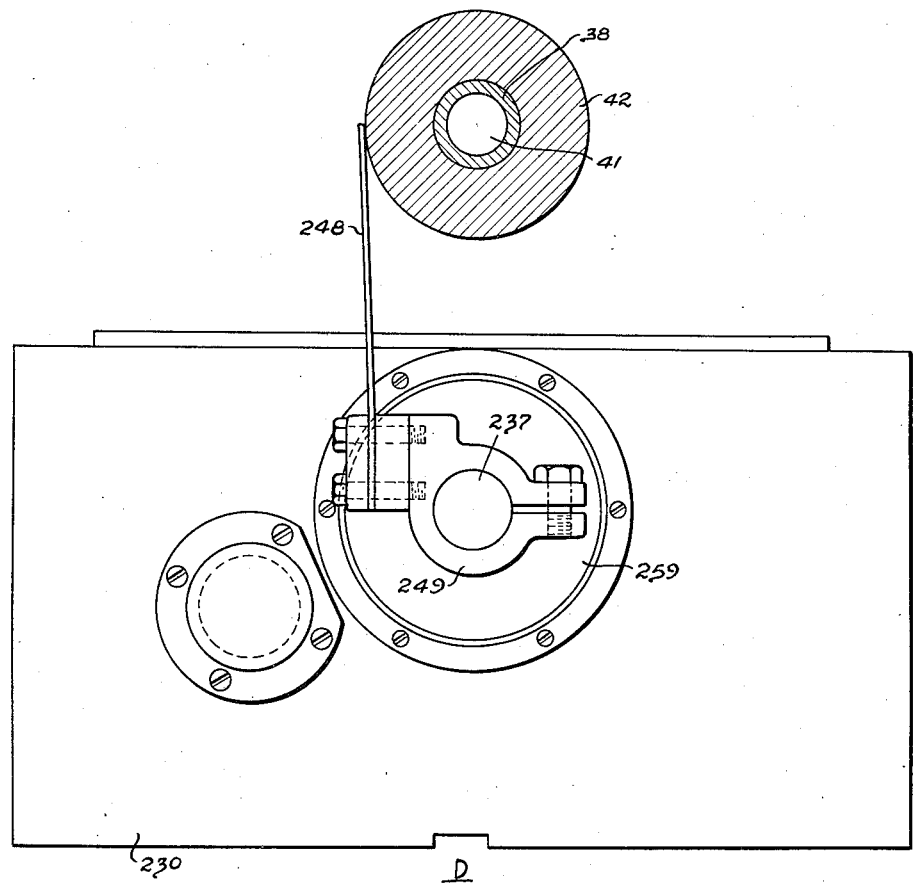
Figure 16:
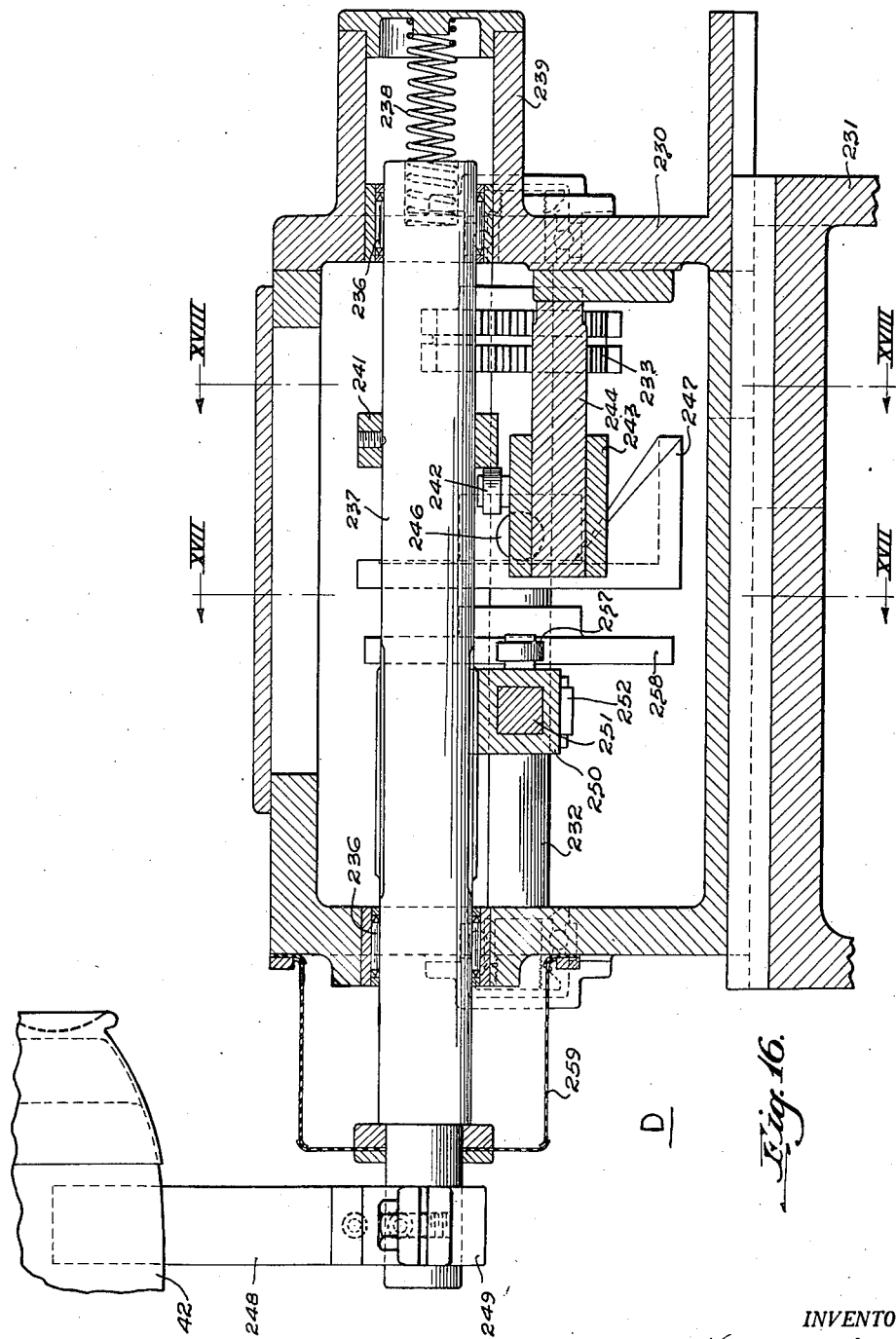
Figure 17:
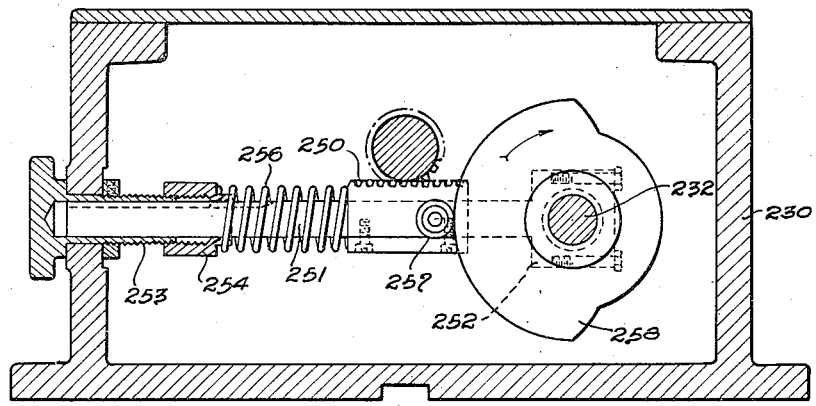
Figure 18:
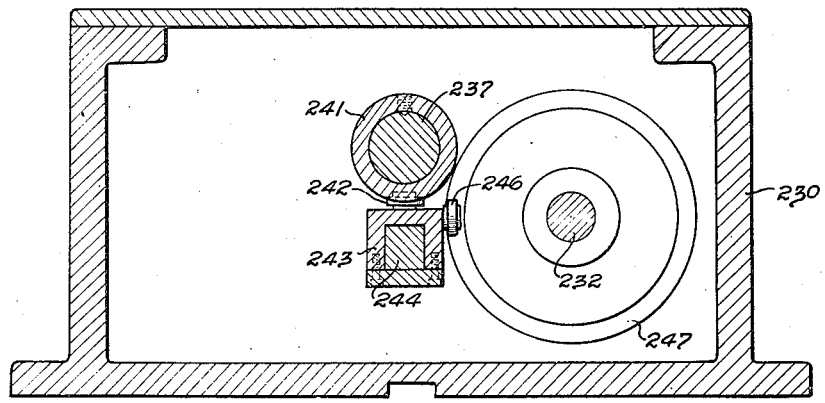

The preferred embodiment of the invention is illustrated in the accompanying drawings in which Fig. 1 is a plan view of my machine with the left half of the turret broken away and with the tools omitted; Fig. 2 is a vertical section taken substantially on the line II—II of Fig. 1; Fig. 3 is a horizontal section through the lower part of the machine; Fig. 4 is an enlarged fragmentary side view, partly broken away, of the foot turning station; Fig. 5 is a view of the outer end of the turning apparatus; Figs. 6 and 7 are enlarged views of the inner ends of the top portions of the topping and turning apparatus, respectively; Fig. 8 is a vertical transverse section taken on the line VIII—VIII of Fig. 6; Fig. 9 is a vertical transverse section taken on the line IX—IX of Fig. 7; Fig. 10 is a vertical longitudinal section through the topping apparatus; Figs. 11, 12, and 13 are vertical transverse sections taken on the lines XI—XI, XII—XII, and XIII—XIII, respectively, of Fig. 10; Fig. 14 is a vertical transverse section taken on the line XIV—XIV of Fig. 4; Fig. 15 is a view of the inner end of the top portion of the burnishing apparatus; Fig. 16 is a vertical longitudinal section through the burnishing apparatus; Figs. 17 and 18 are vertical transverse sections taken on the lines XVII—XVII and XVIII—XVIII, respectively, of Fig. 16; and Fig. 19 is an enlarged vertical section taken on the line XIX—XIX of Fig. 1.

Referring to Figs. 2 and 3 of the drawings, there is mounted on the base of a cylindrical housing 1 a rectangular frame 2 that extends substantially across the housing. Slidable longitudinally on this frame is a bed plate 3 that is held in place by brackets 4 attached to the opposite sides of the frame. The bed plate is adjusted by a screw 6 rotatably mounted in a plate 7 at one end of the frame. The inner end of the screw is threaded through a block 8 projecting from the bottom of the bed plate, and the square outer end of the screw can be turned by a crank inserted through a hole 9 in the side of the housing.

Adjustably mounted on one end of the bed plate is a variable speed unit 11 that supports at one side the electric motor 12 that operates it. The driven pulleys 13 of the unit are connected by belts 14 to pulleys 16 that drive a gear reduction unit 17 mounted on the other end of the plate, as shown in Fig. 2. The reduction unit rotates an upwardly projecting shaft 18 on which an arm 19 is rigidly mounted. The outer end of this arm carries a roller 20 that projects up into a radial slot formed between a pair of spaced parallel bars 21 that are rigidly connected to the bottom of a Geneva rotor 22. This rotor is carried on the lower end of a shaft 23 the upper end of which is rotatably mounted in a bearing 24 projecting downwardly from the top of the housing. Arm 19 rotates the rotor which, once every revolution, rotates a Geneva spider 26 a certain number of degrees. As the machine illustrated has six stations, the spider is rotated 60° for each revolution of the rotor. The spider is mounted on the lower end of a shaft 27 that extends up through the top of the housing. This shaft is journaled in a tubular bearing 28 also extending through the top of the housing. The top of the shaft supports a circular table or turret 29 (Figs. 1 and 2) that is rigidly mounted thereon and carries a cover plate 30 and an encircling shield 31. By adjusting bed plate 3 transversely of the housing by screw 6, the Geneva driving unit 17 can be adjusted laterally relative to rotor 22. This will cause the rotor to be driven at a speed varying during each revolution, whereby the period of motion of the spider will be varied relative to its dwell period.

Mounted on top of the housing are six circumferentially spaced brackets 32 each of which supports a roller 33 rotatable on an axis extending radially of the housing. Above each roller, when the turret is in one of its stationary positions, is a bifurcated block 34 attached to the bottom of the turret and extending radially thereof. Fastened to the bottom of each of these blocks is a hardened wear plate 36 that rests on the underlying roller and thereby steadies the turret while the cups are being worked upon.

Mounted on the bottom of the turret midway between each pair of blocks is a tubular casing 37 through which a spindle 38 extends radially of the turret. The spindle is mounted in bearings 39 located in the opposite ends of the casing where they seal the chamber formed between them around the spindle. Inside the casing the spindle is provided with radial openings that connect the surrounding chamber with an axial passage 41 extending to the outer end of the spindle. Rigidly mounted on this outer end is a cup-receiving chuck 42 that has a passage through its center. Cups are held on the chucks by suction by reducing the air pressure between the cups and the outer ends of the chucks. This is done by connecting the inside of each casing 37 by a hose 43 to one side of a slide valve 44 supported by the bifurcated block 34 behind the casing 37. The other side of the valve is connected by a passage 46 up through the block to a conduit 47 that extends inwardly over the top of the turret to the lower part 48 of a rotary seal mounted on the center of turret 29. The stationary upper part 49 of this seal is connected by a tube 51 to a suitable source of suction (not shown).

For opening the valves, a finger 52 is pivotally mounted near one end in the roller bracket at the left of the loading station A (Fig. 1). The other end of this finger is pivotally connected by a link 53, extending down through the top of the housing, to the center of a radial lever 54 pivotally mounted at its inner end on bearing 28, as shown in Fig. 2. The outer end of this lever is connected to the upper end of an adjustable rod 56 that is slidable vertically in brackets 57 attached to the inside of the housing. The lower end of the rod supports a foot pedal 58 that extends out through a slot in the side of the housing. When this pedal is depressed by the foot of the operator, the finger is swung inwardly and strikes the adjacent valve 44 which it slides inwardly to open the suction line to the spindle casing 37 located at the loading station.

In order to rotate the spindles at the different stations, an electric motor 61 is mounted on top of the housing at each station except the unloading station. As shown in Fig. 2, each motor is connected by a belt 62 to a combination pulley and clutch member 63 rotatably mounted above it on the outer end of a radial stub shaft 64. The shaft is slidably mounted in the end walls of a cylinder 66 rigidly mounted on a flange 67 encircling the upper end of bearing 28. The clutch member is urged toward the cylinder by a coil spring 68 on the shaft compressed between the outer wall of the cylinder and a collar on the shaft. Adjoining the collar is a flexible diaphragm 69 the periphery of which is connected to the side wall of the cylinder. All of the cylinders have the chambers behind their diaphragms connected by vertical pipes 71 to a header 72 that encircles bearing 28. The header is connected by another vertical conduit 73 to a spring-closed slide valve 74 that is mounted on the side of bearing 24 and connected to a suitable source of air pressure (not shown). This valve is periodically opened by a cam 76 mounted on the Geneva rotor shaft. When the valve is opened, the air pressure against the diaphragm 69 forces the shafts 64 outwardly and thereby moves the clutch members 63 into frictional engagement with cooperating clutch members 77 mounted on the inner ends of the adjoining spindles 38, whereby the spindles are rotated by motors 61. Before the turret is indexed again, cam 76 leaves the air pressure valve 74 and permits it to close, whereupon springs 68 disengage clutch members 63 from members 77 so that the turret can rotate.

In order that cups will not be slightly tilted when fitted over chucks at the loading station, loading apparatus is provided to assure that the cup bottoms will lie in a plane perpendicular to the axis of the chuck to which they are applied. Accordingly, as shown in Fig. 1, an outwardly and upwardly extending bracket 81 is attached to the side of the machine housing 1 at the loading station A. The upper end of the bracket is flat and supports a slide 82 that is adjustable thereon radially of the turret. Projecting from the slide toward the chuck at the loading station is a tubular arm 83 coaxial with the chuck. The arm is encircled by traveling bearings on which a tube 86 is mounted so that the tube can be moved lengthwise of the arm. The chuck end of the tube is closed by a socket 87 into the back of which a stop screw 88 is threaded. This screw extends through a bearing 89 in the adjacent end of the arm, and its head will strike against the bearing and limit movement of the tube toward the chuck.

A loading chuck 91, coaxial with the chuck 42, is rotatably mounted in the socket by means of a sealed bearing 92 that forms a chamber between it and the back of the socket. The chuck has a central passage 93 that opens into the chamber. The chuck is shaped to receive the customary tapered foot portion of a partially dried clay cup, with the bottom of the cup resting against the back of the chuck. As the bottom of the cup is in a plane perpendicular to its axis, the cup thus will be held coaxial with the chuck on the turret.

It is preferred to hold the cup in the loading chuck by suction. For this purpose the chamber behind the loading chuck is connected by a valve 96, attached to socket 87, to a flexible hose 97 that leads to a source of suction (not shown). As shown in Fig. 19, the valve preferably is manually operable and may include a vertically movable plug 98 that is normally held in its upper position by a coil spring 99 compressed between the bottom of the plug and a perforated cap 100 at the bottom of the valve. When the plug is in its upper position it closes the suction line but connects the chamber behind the loading chuck to the atmosphere through a passage 101 extending down through the plug.

In applying cups to the machine chucks 42, the operator of the machine stands beside the loading apparatus and places the bottom of a cup in the loading chuck. At the same time he depresses the valve plug 98 with his thumb which thereby disconnects passage 101 from the chamber behind the loading chuck and connects hose 97 with that chamber by means of a horizontal passage 102 through the plug. The operator then moves tube 86 and the loading chuck toward the rotating chuck 42 and thereby telescopes or fits the cup over that chuck. The operator then steps on foot pedal 58 to cause the air pressure inside of the cup to be reduced. At the same time he takes his thumb off the valve plug which thereupon is raised by spring 99 to close the suction line and connect the loading chuck with the atmosphere so that the cup will be released from the loading chuck which is then moved back to its original position. By this time the turret is ready to index the cup to the next station which may be either the topping or foot turning station. Topping is illustrated in the drawings as taking place first at station B, but part of the foot-turning apparatus at station C will be described first. Thus, the outer end of the foot turning apparatus, which looks the same as the topping apparatus, is shown in Fig. 5, and the way in which it is associated with housing 1 and the turret is illustrated by Fig. 4. Figs. 1 and 3 show the relation of both the topping and foot turning apparatus to the main housing. The lower portion of the foot turning apparatus is formed by a hollow bracket 105 bolted to the side of housing 1. The top of the bracket is flat and is provided with a rib 106 extending radially of the turret and projecting up into a groove 107 in the bottom of a control box 108 slidably mounted on the bracket. To hold the box in any desired position its lateral flanges 109 are provided with vertical slots 111 through which extend screws 112 that are screwed into the top of the bracket.

Rotatably mounted in bearings in the end walls of the control box is a cam shaft 113 (Figs. 4, 9, and 14) on the outer end of which a sprocket 114 is rigidly mounted. This sprocket is rotated continuously by a chain 116 extending down through the bottom of the box and through a slot 117 in the top of the bracket to another sprocket 118 splined on a horizontal shaft 119. This shaft is slidably and rotatably mounted in a forked bearing 121 projecting down into the bracket from the bottom of the box. The inner end of the shaft is journaled in a bearing 122 fastened to the side of the bracket, and carries a bevel gear 123 that is driven by a similar gear 124 mounted on the upper end of a vertical shaft 126 the lower end of which is supported in a bearing 127 on the bottom wall of the bracket. This shaft carries a sprocket 128 which is connected by a chain 129 extending through an opening 131 in the side of the housing to a sprocket 132. This sprocket and a sprocket 133 above it are rigidly mounted on the same vertical shaft 134 journaled in a bracket 136 attached to the inside of the housing. The upper sprocket is driven continuously by a chain 137 from a sprocket 138 mounted on rotor shaft 23 between rotor 22 and cam 76 above it. The sprockets are the same size so that for every rotation of the rotor the shafts in bracket 105 and the cam shaft in the control box make one revolution. Chain 137 also passes around a small idler take-up sprocket 139 supported by an arm 140 adjustably connected to bracket 136. This idler sprocket also compels the chain to engage about half of the teeth of drive sprocket 138.

Returning now to the topping apparatus at station B, it includes elements that are the same as those numbered 105 to 136 of the foot turning apparatus, and these elements, insofar as they are shown and numbered, are therefore designated by the same reference numerals used in describing the foot turning apparatus, except that each number is followed by the letter c. Mounted on the front or inner end of cam shaft 113c in the topping control box 108c, as shown in Figs. 8, 10, and 11, is a cam 141, the rear surface of which engages a cam follower roller 142 carried by a collar 143 clamped on a horizontal tube 144 that is coaxial with the chuck 42 at this station. This tube is mounted on bearings 146 that encircle and travel along a tubular arm 147 extending through the box from its rear end wall. The space between the projecting front end of tube 144 and the surrounding wall of the box is closed by a flexible diaphragm 148. The tube is prevented from rotating on the arm by means of a collar 149 clamped on the tube and carrying a roller 151 that travels in a bifurcated guide 152 attached to the top wall of the box. The front end of the tube is closed by a tapered plug 153 that rotatably supports a gage block 154 the end surface of which is shaped to conform to the bottom of the cup on the chuck. The tube is urged toward the chuck by means of a very light coil spring 156 compressed between plug 153 and a shoulder on a threaded stud 157 that is slidably mounted in the hollow arm. This stud is prevented from rotating by a key 158 projecting from the arm into a longitudinal slot 159 in the side of the stud. The stud extends into an internally threaded screw 161 that is rotatably mounted in the end of the arm and that can be turned by a knurled head 162 at its outer end for controlling the pressure on the spring. It will be seen that the spring urges the gage block toward the chuck, while cam 141 periodically moves the tube 144 inwardly on its supporting arm 147.

The cam shaft 113c also carries a cam 163 the front surface of which engages a cam follower roller 164 mounted on a sleeve 166 below it which is slidable parallel to the cam shaft on a square stub shaft 167 projecting rearwardly from the front wall of the box. The sleeve carries another roller 168 that is adapted to engage the rear surface of a flanged collar 169 rigidly mounted on a tube 171 parallel to the gage tube 144. This tube is mounted on bearings 172 that travel along a tubular arm 173 extending from the rear end wall of the box through the opposite end wall. The space between the tube and front end wall of the box is sealed by sealing members 174 frictionally engaging the tube. The tube is urged inwardly along the arm by a coil spring 176 attached to a pin 177 rotatably mounted in the center of a plug 178 in the projecting end of the tube. This spring extends through the hollow arm 173 and is connected to a threaded stud 179 that is prevented from rotating by a key 181 projecting from the arm into a longitudinal slot 182 in the side of the stud. The stud extends into an internally threaded screw 183 rotatably mounted in the end of the arm and which can be turned by a head 184 on its outer end to adjust the tension on the spring. As cam 163 rotates, it presses against roller 164 on sleeve 166 and thereby moves the sleeve forward on the square shaft to press the other roller 168 against the flanged collar 169. This moves tube 171 forward on the arm and against the tension of spring 176.

As shown in Figs. 6 and 10, a collar 186 is clamped on the projecting end of the lower tube 171, and the collar has a lateral projection 190. A leaf spring 187, disposed radially of the collar beside its projection, has its inner end rigidly connected to the collar while its outer end supports a block 188 in which the topping tool 189 is mounted. This spring can be adjusted toward and away from the collar projection by a bolt 191 extending through the central portion of the spring and through the outer end of the projection.

When a cup arrives at the topping station the cam 141 is holding the gage tube in its outer or retracted position while cam 163 is holding the tool tube in its inner or forward position. As the cams continue to rotate, cam 141 recedes and thus permits spring 156 to move the gage tube toward the cup until the gage block lightly engages its bottom. The gage tube is then locked in this position, as shown in Figs. 10 and 12, by means of a brake shoe 192 the upper end of which is pivotally connected to one side of a sleeve 193 slidable on the square portion of a shaft 194 extending across the upper part of the control box. The sleeve is urged toward adjustable lock nuts 196 on the shaft by a coil spring 197. The central portion of the shoe has an arcuate friction surface that engages the side of the gage tube. The lower end of the shoe is provided with a roller 198 that is engaged by a cam 199 mounted on the cam shaft and which periodically swings the shoe toward the tube to hold it against longitudinal movement on arm 147.

While this is taking place, the tool tube 171 is rotated a few degrees to swing the topping tool in against the chuck at a point spaced from the top of the cup. This is accomplished by providing the inner end of the tool tube with gear teeth 201 with which a rack 202 meshes as shown in Figs. 10 and 13. The rack is slidable on the square portion of a shaft 203 extending from one side wall of the control box to a bearing 204 mounted on the cam shaft. One side of the rack is provided with a roller 206 that is pressed against a cam 207 on the cam shaft by means of a coil spring 208 compressed between the opposite end of the rack and the side of the box. When either the spring or the cam moves the rack, the latter turns the tool tube to swing the tool. The tool is swung against the chuck when spring 208 is permitted by cam 207 to move the rack.

By this time the cam 163 starts to recede to permit lower spring 176 to pull the tool tube inwardly on arm 173 so that the topping tool is brought into contact with the upper edge of the rotating cup to which it gives the desired shape. As the tool continues to move outwardly along the chuck, it gradually reduces the height of the cup until the movement of the tool tube is stopped by the flanged collar 169 striking a stop roller 211 supported by collar 149 on the gage tube. As collar 149 is always the same distance from the bottom of every cup being topped, it will be seen that for every cup the topping tool is permitted to move toward gage block 154 exactly the same predetermined distance, so all the cups are trimmed down to the same height by the tool as it shapes their upper edges. When topping is completed, cam 163 pushes tool tube 171 forward to its original position, and cam 207 causes rack 202 to turn the tube so that the tool is swung away from the chuck.

After the cup has been topped, the turret is indexed to carry the cup to the foot turning station C which is the same, except for a few details, as the topping station. Thus, as shown in Fig. 9, the cam shaft 113 carries cams 141e, 163e, and 199e that have the same shape and function as cams 141, 163, and 199, respectively, of Fig. 8. The principal differences are that the tool itself is different and the tool-supporting tube 171e (Figs. 4 and 14) preferably is rotated continuously instead of being oscillated. The tool, of course, is shaped to turn a foot of the desired shape on the cup. As shown in Fig. 7, the turning tool 215 is adjustably fastened to the front side of a radial projection of a collar 216 clamped on its supporting tube 171e. Behind the tool a pin 217 in the radial projection extends parallel to the axis of the tube. Pivotally mounted on this pin is a radial arm 218 the inner end of which engages a stop screw 219 supported at the front side of the collar. Extending rearwardly from the outer end of this arm is a foot burnishing member 221 that has its free end biased outwardly by a coil spring 222 mounted on pins 223 projecting from adjacent surfaces of the collar and member 221. This member follows tool 215 and smooths the surface of the groove cut by the tool.

Instead of having a rack for swinging the tool toward and away from the chuck, cam shaft 113 is provided with a gear 224 that meshes with another gear 225 (Figs. 4 and 14) mounted on the rear end of tool tube 171e so that the tube and tool are continuously rotated. The foot is formed on a cup when the tool passes across a rapidly revolving cup at the foot turning station. Unlike the topping operation, the foot turning tool is moved rearwardly until opposite the lower portion of the cup before the tool is swung into engagement with the cup.

The topped and footed cup is then indexed by the turret to the next station D which is where the outer surface of the cup is burnished. As shown in Figs. 1, 3, and 16, the control box 230 at this station is adjustably supported by a bracket 231 in the same manner as those at the two preceding stations, but as it is not important to stop the outward movement of the burnishing tool along the cup at any particular point, no gaging means is provided for contact with the bottom of the cup.

The control box contains a cam shaft 232 on which a sprocket 233 is rigidly mounted. This sprocket is driven continuously by a chain from driving mechanism below it which is driven by a sprocket 234 inside housing 1, as shown in Fig. 3. Rotatably and slidably mounted in bearings 236 in the opposite ends of the box is a tool-supporting shaft 237 that projects from the front of the box. This shaft is urged forward by a coil spring 238 compressed between its rear end and the outer end of a cylindrical projection 239 on the back wall of the box. Forward movement of the tool shaft is limited by a collar 241 rigidly mounted thereon and engaging a roller 242 carried by a square sleeve 243. This sleeve is slidably mounted on a square stub shaft 244 projecting inwardly from the rear wall of the box, and carries another roller 246 that engages a cam 247 rigidly mounted on the cam shaft. As the cam rotates, it moves the rollers and sleeve backwardly on the square shaft and thereby moves the tool shaft in the same direction against the resistance of spring 238.

As the tool shaft is retracted by cam 247, the shaft is turned to swing the burnishing tool 248 against the cup. The tool is rigidly connected at its lower end to a collar 249 clamped on the projecting end of shaft 237. The shaft is turned by a rack 250 slidably mounted on the square portion of a shaft 251 extending transversely of the control box as shown in Fig. 17. The inner end of this shaft is supported by a bearing 252 on the cam shaft, while its cylindrical outer end portion extends into the smooth bore of a hollow screw 253 rotatably mounted in the side wall of the box. Threaded on this screw is a nut 254 that projects into a longitudinal groove in the side of shaft 251 so that by turning the screw the nut can be adjusted along the shaft to vary the pressure on a coil spring 256 encircling the shaft between the nut and rack. The rack has a roller 257 projecting from one side which is engaged by a cam 258 fastened to the cam shaft. When the cam moves the roller and rack, the rack teeth, which mesh with teeth formed on the tool shaft, turn the latter.

As soon as burnishing has been completed, cam 258 moves the rack toward nut 254 to swing the tool away from the cup. At substantially the same time cam 247 permits spring 238 to move the tool shaft forward in the control box to its original position. The front bearing is protected from clay by a thin rubber housing 259 encircling the tool shaft and attached to the shaft and control box.

Following burnishing, the table is rotated to index the cup to the next station E where slide valve 44 in the suction line to the chuck is opened by striking against a cam 260 mounted on a bracket 32 as shown in Fig. 1. This permits air to enter the chuck so that an operator can remove the finished cup therefrom. At the next station F the chuck can be wiped off, if necessary, to prepare it for receiving a new cup at the loading station.

After a cup has been applied to one of the chucks at the loading station, it is then automatically topped, turned and burnished by this machine. Considerable manual labor not only is saved, but these finishing operations are speeded up materially over prior hand methods. Of equal or greater importance is the fact that all cups of the same type are finished alike. That is, they are all trimmed by the topping tool down to the same height, feet of the same size and shape are formed on all of the cups, and they all receive the same amount of burnishing. More uniform sets of cups are thus produced, and the number of seconds or rejects is greatly decreased. The machine itself can readily be adjusted for finishing different shapes of cups and for varying the length of the finishing operations.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. Cup finishing apparatus comprising a turret, a plurality of radial spindles rotatably supported by the turret, a cup-receiving chuck mounted on the outer end of each spindle, means for intermittently rotating the turret to index the chucks from station to station, continuously rotating means mounted adjacent the inner ends of the spindles at some of said stations, means for temporarily connecting said continuously rotating means with the adjacent spindles to rotate them, and means beside the turret for removing clay from partially dried clay cups mounted on the rotating chucks.

2. Cup finishing apparatus comprising a turret, a plurality of radial spindles rotatably supported by the turret, a cup-receiving chuck mounted on the outer end of each spindle, means for intermittently rotating the turret to index the chucks from station to station, clutch means mounted adjacent the inner ends of the spindles at some of said stations, means for continuously rotating said clutch means, means for periodically moving said clutch means into operative engagement with the adjacent spindles to rotate them, and means beside the turret for removing clay from partially dried clay cups mounted on the rotating chucks.

3. Cup finishing apparatus comprising a turret, a plurality of radial spindles rotatably supported by the turret, a cup-receiving chuck mounted on the outer end of each spindle, continuously rotating driving means, intermittently rotating means driven by said driving means and connected to the turret for indexing the chucks from station to station, clutch means mounted adjacent the inner ends of the spindles at some of said stations, means for continuously rotating said clutch means, means controlled by said driving means for periodically moving said clutch means into operative engagement with the adjacent spindles to rotate them, and means beside the turret for removing clay from partially dried clay cups mounted on the rotating chucks.

4. Cup finishing apparatus comprising a turret, a plurality of radial spindles rotatably supported by the turret, a cup-receiving chuck mounted on the outer end of each spindle, means for intermittently rotating the turret to index the chucks from station to station, clutch means mounted adjacent the inner ends of the spindles at some of said stations, means for continuously rotating said clutch means, resilient means normally spacing said clutch means from the spindles, fluid-operated means for moving said clutch means into operative engagement with the adjacent spindles to rotate them, means automatically controlling said fluid-operated means, and means beside the turret for removing clay from partially dried clay cups mounted on the rotating chucks.

5. Cup finishing apparatus comprising a turret, a plurality of radial spindles rotatably supported by the turret, a cup-receiving chuck mounted on the outer end of each spindle, means for intermittently rotating the turret to index the chucks from station to station, a conduit for connecting each chuck to a source of actuating fluid for holding cups on the chucks, a closed valve in each conduit, manually operable means for opening each valve when the chuck associated therewith is at a given station, means for automatically closing the valve when the associated chuck reaches another given station, continuously rotating means mounted adjacent the inner ends of the spindles at some of said stations, means for temporarily connecting said continuously rotating means with the adjacent spindles to rotate them, and means beside the turret for removing clay from partially dried clay cups mounted on the rotating chucks.

6. Cup finishing apparatus comprising a turret, a plurality of radial spindles rotatably supported by the turret, a cup-receiving chuck mounted on the outer end of each spindle, means for intermittently rotating the turret to index the chucks to a plurality of stations, means beside the turret at one station for applying cups to the chucks, means at another station for trimming the tops of the cups on said chucks, means at another station for turning a foot on each cup, means at a further station for burnishing the outside of the cups, a still further station being adapted for removal of finished cups from the chucks, and means for rotating said chucks at said topping and turning and burnishing stations.

7. Cup finishing apparatus comprising a rotary chuck, a tool for removing clay from a partially dried clay cup fitted over the outer end of the chuck, means for moving the tool outwardly along the chuck, and means adapted to be positioned by the cup for stopping the tool a predetermined distance from the bottom of the cup regardless of the position of the cup on the chuck.

8. Cup finishing apparatus comprising a rotary chuck, a tool for removing clay from a partially dried clay cup fitted over the outer end of the chuck, means for moving the tool outwardly along the chuck, and means adapted to engage the bottom of the cup for stopping said tool a predetermined distance from said bottom.

9. Cup finishing apparatus comprising a rotary chuck, a tool for removing clay from a partially dried clay cup fitted over the outer end of the chuck, means for moving the tool outwardly along the chuck, spring-pressed means adapted to engage the bottom of the cup for stopping said tool a predetermined distance from said bottom, and means for locking said spring-pressed means in tool-stopping position.

10. Cup finishing apparatus comprising a rotary chuck, a tool for removing clay from a partially dried clay cup fitted over the outer end of the chuck, means for moving the tool outwardly along the chuck, and means in alignment with the chuck adapted to be moved inwardly toward its outer end into engagement with the bottom of the cup for stopping said tool a predetermined distance from said bottom.

11. Cup finishing apparatus comprising a rotary chuck, a tool for removing clay from a partially dried clay cup fitted over the outer end of the chuck, means for moving the tool outwardly along the chuck, gage means movable axially of the chuck for engaging the bottom of the cup, and a stop member projecting laterally from said gage means for stopping said tool a predetermined distance from said bottom.

12. Cup finishing apparatus comprising a rotary chuck, a tool for removing clay from a partially dried clay cup fitted over the outer end of the chuck, means for moving the tool outwardly along the chuck, means for stopping the tool a predetermined distance from the bottom of the cup regardless of the position of the cup on the chuck, and means for locking said tool-stopping means in tool-stopping position.

13. Cup finishing apparatus comprising a rotary chuck, a tool for removing clay from a partially dried clay cup fitted over the outer end of the chuck, a tool support, means for turning the support on an axis substantially parallel to the chuck axis during each cup finishing operation, means for moving said support outwardly along the chuck, and means adapted to be positioned by the cup for stopping said outward movement of the support when said tool is a predetermined distance from the bottom of the cup regardless of the position of the cup on the chuck.

14. Cup finishing apparatus comprising a rotary chuck, a tool for removing clay from a partially dried clay cup fitted over the outer end of the chuck, a tool support, means for turning the support on an axis substantially parallel to the chuck axis, means for moving said support outwardly along the chuck, and means adapted to engage the bottom of the cup for stopping said outward movement of the support when said tool is a predetermined distance from said bottom.

15. Cup finishing apparatus comprising a rotary chuck, a tool for removing clay from a partially dried clay cup fitted over the outer end of the chuck, a tool support, means for turning the support on an axis substantially parallel to the chuck axis, means for moving said support outwardly along the chuck, gage means movable axially of the chuck for engaging the bottom of the cup, and a stop member projecting laterally from said gage means for stopping said outward movement of the tool support when said tool is a predetermined distance from said bottom.

16. Cup finishing apparatus comprising a rotary chuck, a tool for removing clay from a partially dried clay cup fitted over the outer end of the chuck, a tool support, means for turning the support on an axis substantially parallel to the chuck axis, means for moving said support outwardly along the chuck, gage means movable axially of the chuck for engaging the bottom of the cup, a stop member projecting laterally from said gage means for stopping said outward movement of the tool support when said tool is a predetermined distance from said bottom, means for subsequently moving said support inwardly along the chuck, and means for thereafter moving said gage means away from the chuck.

17. Cup finishing apparatus comprising a rotary chuck, a tool for removing clay from a partially dried clay cup fitted over the outer end of the chuck, means for moving the tool outwardly along the chuck, gage means movable axially of the chuck for engaging the bottom of the cup, means for locking said gage means in cup-engaging position, and a stop member projecting laterally from said gage means for stopping said tool a predetermined distance from said bottom.

18. Cup finishing apparatus comprising a rotary chuck, a tool for removing clay from a partially dried clay cup fitted over the outer end of the chuck, a tool support, means for turning the support on an axis substantially parallel to the chuck axis during each cup finishing operation to automatically move the tool into and out of engagement with each cup, and means for moving said support outwardly along the chuck.

19. Cup finishing apparatus comprising a rotary chuck, a tool for removing clay from a partially dried clay cup fitted over the outer end of the chuck, a tool support beside the chuck, means for turning the support on an axis substantially parallel to the chuck axis during each cup finishing operation to automatically move the tool into and out of engagement with each cup, a spring for moving the support axially in one direction, and a continuously rotating cam for moving the support in the opposite direction.

20. Cup finishing apparatus comprising a rotary chuck, a tool for removing clay from a partially dried clay cup fitted over the outer end of the chuck, a tool support beside the chuck, means for turning the support on an axis substantially parallel to the chuck axis, a spring for moving the support axially in one direction, a continuously rotating cam for moving the support in the opposite direction, a collar rigidly mounted on the support, a non-rotatable member movable parallel to said support axis, and a pair of rollers carried by said member, one of said rollers engaging the cam and the other engaging the collar.

21. Cup finishing apparatus comprising a rotary chuck, a tool for cutting clay from a partially dried clay cup fitted over the outer end of the chuck, a tool support beside the chuck movable substantially parallel to the chuck axis, a spring for moving the support outwardly, gage means spaced from the outer end of the chuck and movable axially thereof, a spring for moving said means into contact with the bottom of the cup, a continuously rotating cam shaft beside said means and tool support, a cam on said shaft for moving said means away from the chuck, a cam on said shaft for moving said support inwardly, means mounted on said shaft for turning said support to move the tool into contact with the cup, and means connected to said gage means for limiting outward movement of said support.

22. Cup finishing apparatus comprising a rotary chuck, a tool for cutting clay from a partially dried clay cup fitted over the outer end of the chuck, a tool support beside the chuck movable substantially parallel to the chuck axis, a spring for moving the support outwardly, gage means spaced from the outer end of the chuck and movable axially thereof, a spring for moving said means into contact with the bottom of the cup, a continuously rotating cam shaft beside said means and tool support, a cam on said shaft for moving said means away from the chuck, a cam on said shaft for moving said support inwardly, a brake, a cam on said shaft for pressing the brake against said means to lock said means in cup-engaging position, means mounted on said shaft for turning said support to move the tool into contact with the cup, and means connected to said gage means for limiting outward movement of said support.

23. Cup finishing apparatus comprising a rotary chuck, a tool for cutting clay from a partially dried clay cup fitted over the outer end of the chuck, a tool support beside the chuck movable substantially parallel to the chuck axis, gage means spaced from the outer end of the chuck and movable axially thereof, a continuously rotating cam shaft beside said means and tool support, a cam on said shaft normally holding said means retracted, a spring for advancing said means into contact with the bottom of the cup when said means is released by the cam, means for locking said gage means in cup-contacting position, a cam on said shaft normally holding said tool support in its inner position, a spring for moving said support outwardly when the support is released by its cam, said cams being positioned on said shaft to first release said gage means and then said support, and means connected to said gage means for limiting said outward movement of said support.

24. Cup finishing apparatus comprising a rotary chuck, a tool for cutting clay from a partially dried clay cup fitted over the outer end of the chuck, a tool support beside the chuck movable substantially parallel to the chuck axis, gage means spaced from the outer end of the chuck and movable axially thereof, a continuously rotating cam shaft beside said means and tool support, a cam on said shaft normally holding said means retracted, a spring for advancing said means into contact with the bottom of the cup when said means is released by the cam, means for locking said gage means in cup-contacting position, a cam on said shaft normally holding said tool support in its inner position, a spring for moving said support outwardly when the support is released by its cam, said cams being positioned on said shaft to first release said gage means and then said support, means connected to said gage means for limiting said outward movement of said support, a rack for turning said support to swing said tool into engagement with the cup, and a cam on said shaft for reciprocating the rack.

25. Cup finishing apparatus comprising a rotary chuck, a tool for cutting clay from a partially dried clay cup fitted over the outer end of the chuck, a tool support beside the chuck movable substantially parallel to the chuck axis, gage means spaced from the outer end of the chuck and movable axially thereof, a continuously rotating cam shaft beside said means and tool support, a cam on said shaft normally holding said means retracted, a spring for advancing said means into contact with the bottom of the cup when said means is released by the cam, means for locking said gage means in cup-contacting position, a cam on said shaft normally holding said tool support in its inner position, a spring for moving said support outwardly when the support is released by its cam, said cams being positioned on said shaft to first release said gage means and then said support, means connected to said gage means for limiting said outward movement of said support, and meshing gears mounted on said shaft and support for continuously rotating said support to move said tool across the cup.

26. Cup finishing apparatus comprising a rotary chuck adapted to support a partially dried clay cup fitted over its outer end, a box disposed adjacent said outer end, a pair of laterally spaced parallel tubes slidable axially in the box and projecting toward the chuck, one of the tubes being in axial alignment with the chuck and the other tube extending beside the chuck, a cam shaft journaled in the box beside said tubes, a gage block rotatably mounted on the projecting end of said one tube, a clay-cutting tool projecting laterally from the projecting end of the other tube, a spring for moving the gage block tube outwardly of the box to contact the gage block with the bottom of the cup, means operated from said shaft for locking the tube in its outer position, a spring for moving the tool tube in one direction, a cam on said shaft for moving the tool tube in the opposite direction, means on the locked tube for limiting movement of the tool tube inwardly of the box, means for turning the tool tube to swing the tool into engagement with the cup, and a cam on said shaft for retracting the gage block tube.

27. Cup finishing apparatus comprising a rotary chuck, a loading chuck coaxial with the rotary chuck and spaced therefrom for receiving and temporarily holding the bottom of a cup, means supporting the loading chuck and movable in a straight line toward and away from the rotary chuck to apply said cup to the latter, and means for performing a finishing operation on the cup on the rotary chuck.

28. Cup finishing apparatus comprising a rotary chuck, a vacuum loading chuck coaxial with the rotary chuck and spaced therefrom for receiving the bottom of a cup, means rotatably supporting the vacuum chuck, means for temporarily reducing the air pressure in the vacuum chuck behind the cup to hold the cup therein, means on which said supporting means is movable in a straight line toward and away from the rotary chuck to apply said cup to the latter, and means for performing a finishing operation on the cup on the rotary chuck.

29. Cup finishing apparatus comprising a rotary chuck, a vacuum loading chuck coaxial with the rotary chuck and spaced therefrom for receiving the bottom of a cup, means rotatably supporting the vacuum chuck, a vacuum line connected to the vacuum chuck, a three-way valve in said line normally closing it and connecting the inside of the vacuum chuck with the atmosphere, said valve being operable to open said line and close the connection to atmosphere to hold the cup in the vacuum chuck, means on which said supporting means is movable in a straight line toward and away from the rotary chuck to apply said cup to the latter, and means for performing a finishing operation on the cup on the rotary chuck.

30. Cup finishing apparatus comprising a rotary chuck, a vacuum loading chuck coaxial with the rotary chuck and spaced therefrom for receiving the bottom of a cup, means rotatably supporting the vacuum chuck and forming a chamber behind it communicating with the inside of the vacuum chuck, a conduit connected to said chamber and adapted to be connected to a source of suction, a spring-pressed valve member in said conduit normally closing the conduit and provided with a passage normally connecting the vacuum chuck with the atmosphere, said valve member having a passage through it for connecting the vacuum chuck with the source of suction when said member is moved inwardly, said inward movement of said member simultaneously disconnecting said first-mentioned passage from the vacuum chuck whereby the cup is held in the latter, means on which said supporting means is movable in a straight line toward and away from the rotary chuck to apply said cup to the latter, and means for performing a finished operation on the cup on the rotary chuck.

31. Cup finishing apparatus comprising a turret, a plurality of radial spindles rotatably supported by the turret, a cup-receiving chuck mounted on the outer end of each spindle, continuously operating driving means, Geneva mechanism operatively connecting said means with the turret for intermittently rotating the turret to index the chucks to a plurality of stations, means beside the turret at one station for applying cups to the chucks, a tool at another station for trimming the tops of the cups on said chucks, a tool at another station for turning a foot on each cup, a tool at a further station for burnishing the outside of the cups, means for rotating said chucks at said topping and turning and burnishing stations, and means driven continuously by said driving means for moving said tools into and out of engagement with cups on said chucks.

32. Cup finishing apparatus comprising supporting means, a plurality of spindles rotatably supported by said means, a cup-receiving chuck mounted on one end of each spindle, means for intermittently moving said supporting means to index the chucks to a plurality of stations, means beside said supporting means at one station for trimming the tops of the cups on said chucks, means at another station for turning a foot on each cup, means at another station for burnishing the outside of the cups, and means for rotating said spindles at said stations.

WALTER H. EMERSON.